United States Patent

[11] 3,602,701

| [72] | Inventor | David M. Boyd, Jr. Clarendon Hills, Ill. |
|---|---|---|
| [21] | Appl. No. | 761,537 |
| [22] | Filed | Sept. 23, 1968 Division of Ser. No. 783,365, Dec. 29, 1958, Patent No. 3,458,691, which is a Continuation-in-part of Ser. No. 608,531, Sept. 7, 1956, abandoned |
| [45] | Patented | Aug. 31, 1971 |
| [73] | Assignee | Universal Oil Products Company |

[54] PROCESS CONTROL METHOD
3 Claims, 6 Drawing Figs.

[52] U.S. Cl. .................................................. 235/150.1,
208/134, 208/308, 208/113, 235/151.12
[51] Int. Cl. .................................................. G06f 15/18
[50] Field of Search ........................................... 235/151.12,
150.1

[56] References Cited
UNITED STATES PATENTS

| 3,044,701 | 7/1962 | Kerstukos et al. ............ | 235/150.1 |
| 3,048,331 | 8/1962 | Van Nice et al. ............. | 235/150.1 |
| 3,458,691 | 7/1969 | Boyd .......................... | 235/151.12 |

Primary Examiner—Malcolm A. Morrison
Assistant Examiner—R. Stephen Dildine, Jr.
Attorneys—James R. Hoatson, Jr. and Philip T. Liggett ABSTRACT: A method for optimalizing the operation of a process having an output of a plurality of components of different unit economic values, where there is a setting of a variable parameter to a first setting, a registering of the performance of such setting, a changing of the parameter by a predetermined increment and a time interval sufficient to stabilize prior to registering a new performance of the process, then evaluating the last registering with the prior performance, and repeating the sequence of steps until performance is substantially maximized.

PROCESS CONTROL METHOD

This application is a division of my copending application, Ser. No. 783,365, filed Dec. 29, 1958 now U.S. Pat. No. 3,458,691 issued July 29, 1969, which in turn is a continuation-in-part of my earlier application, Ser. No. 608,531, filed Sept. 7, 1956, now abandoned.

This invention relates to an apparatus for controlling a continuous process and particularly to a process control system which cooperates with the process to achieve an economic optimization thereof; in so doing, this control system both maintains processing conditions at a desired level and determines at what level the conditions should be maintained in order to realize a maximum profit from the operation of the process.

In many industries employing continuous flow processes, particularly in the chemical and petroleum refining industries where a raw material is treated to obtain an improved product, and in the electric power industry where fuel or hydraulic or nuclear energy is converted into electric power, it is common practice to place under automatic control at least the significant processing conditions, that is, those operating variables which influence the yield or quality of the produce. Process variables most frequently utilized include flow and liquid level for inventory control, and pressure, temperature, specific gravity, thermal and conductivity, refractive index, viscosity, dielectric constant, etc. for composition control; in addition, direct measurement of composition may be obtained by means of automatic stream analyzers such as the chromatograph or mass spectrometer. In the electric power industry where the final product is energy, the variables of speed, torque, voltage, current, power factor, and frequency are commonly employed as indices of process performance.

Heretofore, the usual manner of operating a process has been to select arbitrarily, at least within design limits, a set of operating conditions and to place the desired variables under independent automatic control, maintaining them constant for long periods of time. Whatever changes in processing conditions are deemed necessary are done at the direction of the plant operator whose decisions are based largely on a predetermined and often imperfect knowledge of process behavior; the interaction of the many variables involved is simply too complicated to permit an accurate determination by the operator of the changes required to keep the process running at peak efficiency, and in addition there may be outside disturbances or subtle detrimental effects entering into the picture, the existence of which remains totally unknown to the operator until the performance of the process deteriorates appreciably. In consequence, as long as the human operator is charged with the duty of determining the level at which processing conditions are to be held, it is difficult, if not impossible, to maintain the process at maximum efficiency; at the very least, the process will be operated at less than peak efficiency for prolonged periods. Even if the actual performance is only a fraction of a percent less than the maximum possible, the economic loss resulting thereby may run into thousands of dollars during the life of the process unit; and of course, the larger the throughput the greater the loss.

In the broadest sense, is an embodiment of this invention to provide a control system for a process in which a material is acted upon to yield a resultant product of different character than said material, which comprises in combination at least one process condition control element, analyzing means producing a signal responsive to the quantity of a component of said resultant product, a multiplier input unit receiving a quantity signal from said analyzing means, a multiplier input unit receiving a predetermined signal representative of the value of said component of said resultant product, a multiplier receiving signals from said input units, multiplying said input signals and emitting a resulting multiplication product signal, a memory means receiving and retaining successive multiplication product signals, a computer determining a comparison between said resulting multiplication product signal and a last previously obtained product signal, computer output means acting upon said process condition control element in response to said comparison until a minimum in the magnitude of said comparison is obtained.

The control system of this invention is applicable to any process in which a charge material is acted upon to yield a resultant product of different character than the charge material. The term "process" as used in this application is intended to encompass all such processes whether it be the generation of heat or electric energy, a nuclear reaction, a physical treatment such as distillation, extraction, crystallization, absorption, absorption, etc., an inorganic chemical reaction, a hydrocarbon conversion process such as cracking, reforming, alkylation, polymerization, etc. or a complex combination of many individual processes. Depending upon the nature of the process, the resultant produce may consist of a single physical stream comprising one or more compounds, a plurality of such streams, or a pure energy stream such as heat or electric power.

A good example of a complex process may be found in the petroleum industry where crude oil is obtained by a refiner and converted into such varying materials as solid phase coke, asphalt and paraffin wax to vapor phase methane, ethane, propane, etc. Multitudinous intermediate products including tar, heavy fuel oil, light fuel oil, varying grades of lubricating oil and grease, diesel oil, gas oil, kerosene, naphtha, gasoline, etc. may also be obtained and the relative amounts of any of these products that may be obtained from any given crude may be changed by the manner in which it is treated.

For example, a total crude oil may be simply distilled to separate the above-mentioned materials in the proportions in which they occur naturally in the crude. When higher yields of one material are desired, it is necessary to convert the others into that material. For example, when more than the natural amount of gasoline is desired, the heavier portions of the crude such as gas oil, fuel oil, or kerosene may be subjected to thermal or catalytic cracking thereby increasing the gasoline yield at the expense of the higher boiling fractions. Similarly, lighter fractions such as ethylene, butene, butylene, propylene, pentene, etc. and combinations of these may be polymerized or alkylated to produce greater quantities of gasoline at the expense of lower boiling fractions. In all these processes, although more gasoline is produced, it is done at a sacrifice of total yield, that is, 100 pounds of gas oil will produce less than 100 pounds of gasoline due to loss of material in such forms as coke on the catalyst and normally gaseous waste material. Similarly, alkylation and polymerization processes result in yield losses. As a general rule, the more severe the conversion process, that is, the more extensive conversion required, the greater the yield losses.

By varying the processing conditions of such a process the proportion of the yields of the various products therefrom may be varied. Each of the products has a given economic value, depending upon the current marker therefor; consequently at any given instant of time, there will exist an optimum product distribution such that the performance of the process is at a maximum. The performance criterion is simply the net dollar output of the process which, in one aspect, is defined as the summation of the multiplication products of the quantity of each of the principal effluent components multiplied by its corresponding unit value. Various modifications of the performance criterion will be discussed in the examples to follow.

It is an object of this invention to provide a process control system comprising commercially available control and computing elements, which system regulates the conditions at which the process is effected responsive to economic considerations so that the process yields the maximum dollar value of the resultant product per unit of charge.

It is another object of this invention to provide a process control system which maintains the process at peak efficiency in the face of outside, unpredictably disturbances to the process.

Still another object of this invention is to provide a control system which continuously experiments with significant processing conditions in order to seek out optimum conditions which cannot be calculated or otherwise be predetermined.

The manner in which the above and other objects are accomplished will be readily understood on reference to the following examples taken in conjunction with the accompanying drawings; these specific examples are intended to be illustrative rather than limiting upon the scope of the invention.

Figure 1:
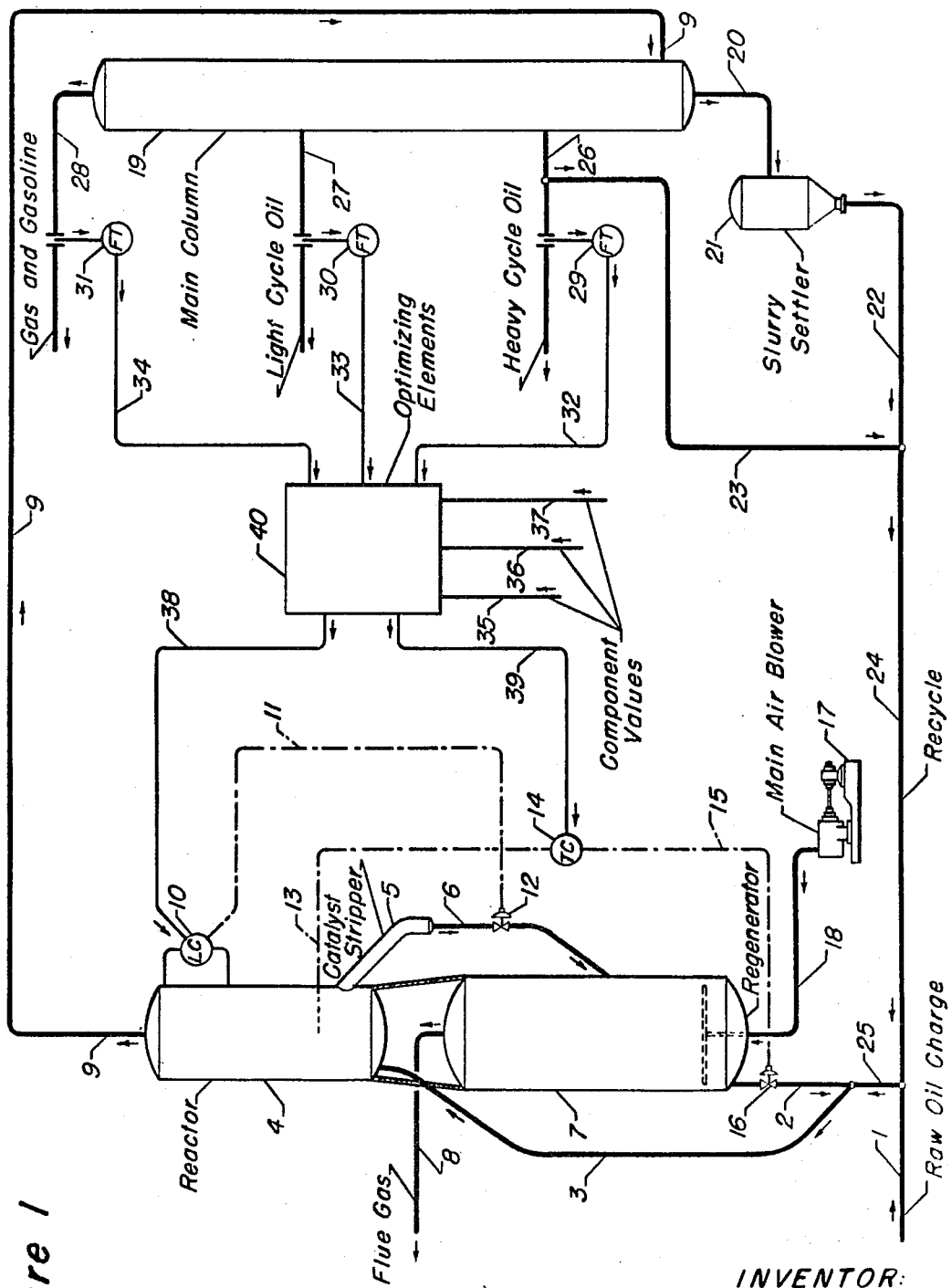
FIG. 1 is a schematic view of a typical fluid catalytic cracking process operating in conjunction with the optimizing elements of the invention.

Referring now to the drawings, there is shown in FIG. 1 a typical fluid catalytic cracking unit wherein a charge stock containing relatively high boiling petroleum fractions is contacted with a fluidized bed of silica-alumina catalyst and converted into coke, kerosene, cycle oils, and normally gaseous material such as butane and lower boiling material. Raw oil charge is introduced in line 1 and combined with recycle material from line 24. Hot regenerated catalyst from line 2 is commingled with the combined feed in line 25 and the resulting mixture is passed through reactor riser 3 to reactor 4. The reactor effluent leaves the reactor via line 9 and passes to main column 19 where it is fractionated into various components. Spent catalyst passes from reactor 4 through catalyst stripper 5 into standpipe 6, thence into regenerator 7 where coke is burned from the surface of the catalyst. Regeneration air is furnished by main air blower 17 through line 18, and the resulting flue gases leave the regenerator via line 8. A bottoms stream is removed from column 19 through line 20 and passed into slurry settler 21 from which a portion of the bottoms is withdrawn as clarified oil (not shown). The remainder of the bottoms passes through line 22, is combined with a portion of heavy cycle oil from line 23, and the total is recycled to the reaction zone through line 24.

Among the significant processing conditions which affect the composition of the reactor effluent are reactor temperature and space velocity. Accordingly, both variables are placed under automatic control, the former by means of temperature controller 14, the latter by means of level controller 10. Temperature controller 14 receives a temperature signal from thermocouple 13 and transmits a control signal via control line 15 to slide valve 16 disposed in line 2; by varying the amount of hot regenerated catalyst introduced into the combined reactor feed, the reactor temperature may be controlled. Lever controller 10 is responsive to the level of the fluidized bed within reactor 4 and controls the inventory of catalyst contained therein by transmitting a control signal via control line 11 to slide valve 12 disposed in standpipe 6; reactor space velocity may thereby be controlled by varying the spent catalyst withdrawal rate. Other processing conditions may be significant, such as the recycle flow rate and reactor pressure, but these are omitted here for the purpose of simplification.

impalpable above-mentioned components of the effluent, for the purpose of the present example, comprise heavy cycle oil, light cycle oil, and gasoline and lighter fractions which are removed from fractionator 19 through lines 26, 27, and 28 respectively. The flow rate of each of these three streams is measured by flow transmitters 29, 30 and 31 and corresponding flow signals are transmitted by lines 32, 33, and 34 to the optimizing elements of the invention represented by box 40. Although flow measuring means 29, 30 and 31 are here shown disposed in the product streams immediately leaving column 19, it should be understood that they may be located anywhere within or following subsequent downstream processing facilities. Optimizing elements 40 receive two sets of inputs; the first comprises continuous analog signals carried by line 32, 33, and 34; the second comprises predetermined signals 35, 36, and 37 which are representative of the unit value of the above mentioned product streams. The optimizing elements manipulate these signals in a manner to be hereinafter described and in accordance therewith adjust the set points of controllers 10 and 14 through control lines 38 and 39 respectively.

Before the process control system is commissioned, the catalytic cracker is brought up to steady state operation at some conventional set of conditions, for example, at an average reactor temperature of 920° F., a liquid hourly space velocity of 2.5 volumes of charge/volume of catalyst per hour, a combined feed ratio of 0.5 volumes of recycle/volume of fresh feed, etc. Now when it is desired to obtain greater gasoline yields at the expense of total yield, the temperature at which the reaction is effected may be increased. Within certain limits the temperature increase will increase the gasoline yield, however, other valuable material will be consumed to do this. Therefore, oil, kerosene or lubricating oil fractions may be converted to unusable coke which would, therefore, represent a loss of a valuable product to obtain a gain of another valuable product.

The control system is then placed into operation and it functions as follows: Optimizing elements 40 multiply each of the flow signals 32, 33, and 34 by corresponding unit value signals 35, 36, and 37 and add the products of these multiplications to obtain the total dollar value of the effluent; the total value is then retained in a memory circuit. The optimizing elements, through suitable output means, impose a predetermined step increase, for example 5° F., on the set point of temperature controller 14. After a predetermined time delay, corresponding to the stabilization time of the process, a new total dollar value is calculated as above and compared with the previous total dollar value; if the second dollar value is higher, a second increment of temperature is added, another predetermined time delay is allowed to occur, and another calculation of the total dollar value is obtained. Successive evaluations and temperature adjustments are repeated until an increased increment of temperature produces a decrease in dollar value, at which time the temperature set point is either held at its present level or returned to its last previous level. The output of optimizing elements 40 is then shifted to adjust the set point of level controller 10 and the reactor levels is varied in the same pattern until its optimum level is found. When this is completed the process control system may again start with reactor temperature and repeat the entire sequence.

Figure 2:
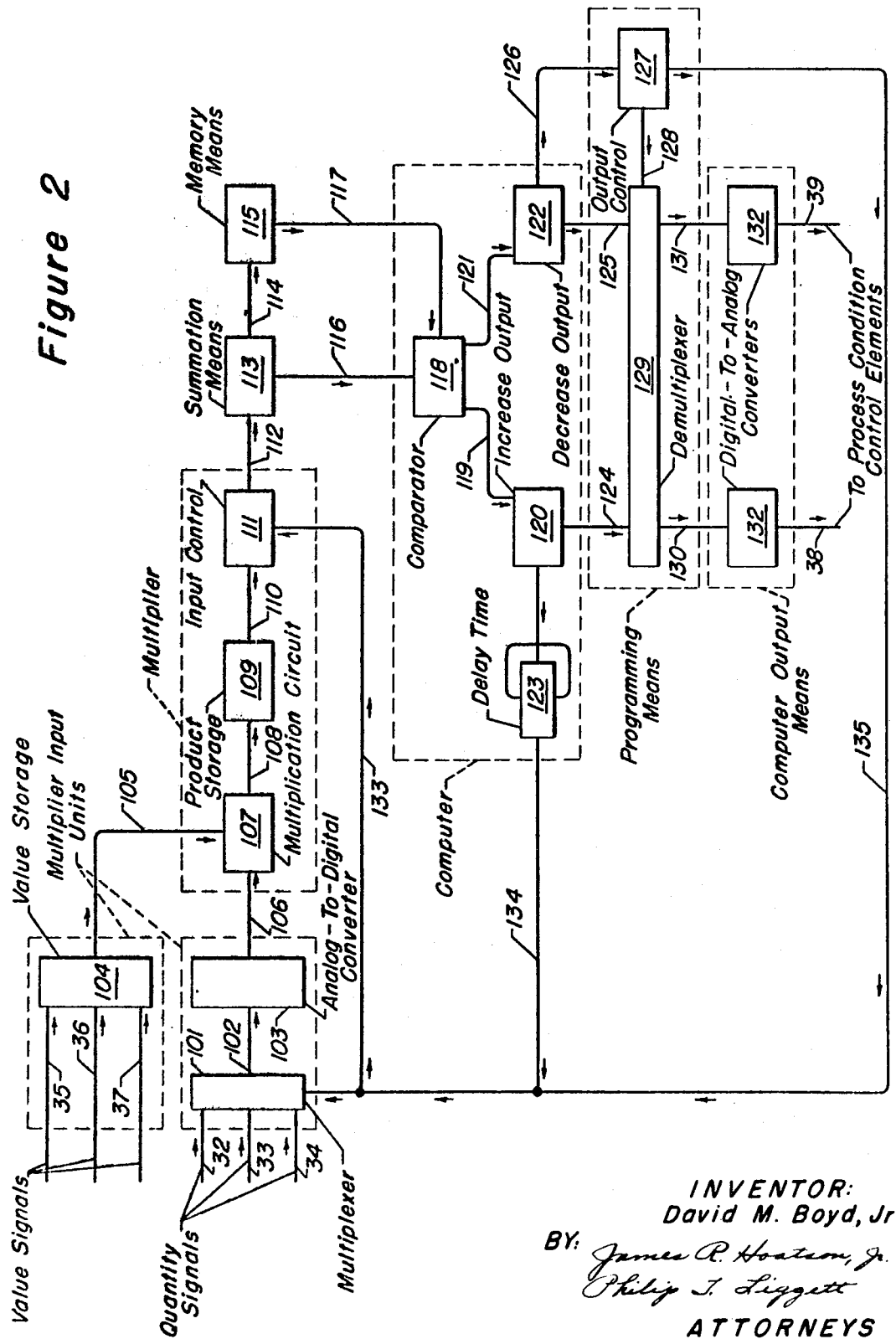
FIG. 2 is a block diagram of a particular embodiment of the optimizing apparatus employed in FIG. 1.

The various elements represented by box 40 are shown in FIG. 2 which illustrates a simple special purpose digital computer comprised of standard, commercially available components. The major components required for the specific embodiment shown herein are:

1. A multiplier input unit receiving value signals.
2. A multiplier input unit receiving quantity signals.
3. A multiplier multiplying each of the quantity signals by its corresponding value signals.
4. A summation means adding the products of said multiplications.
5. A memory means receiving and retaining successive summations.
6. A computer which compares present and past summation signals and produces a digital signal in response thereto.
7. Programming means which sequentially directs the computer output to each of the process condition control elements.
8. Computer output means regulating the set points of the process condition control elements.

FIG. 2 does not show certain standard elements which are required for the operation of any digital computer such as a clock pulse source, various pulse delay lines and gates. These have been omitted contaminants the diagram to avoid any unnecessary complication; however, it is intended that such elements, the selection and placement of which are well within the knowledge of one skilled in the art, will be employed where required in order to insure proper sequential operation of the above listed major components.

Figure 3:
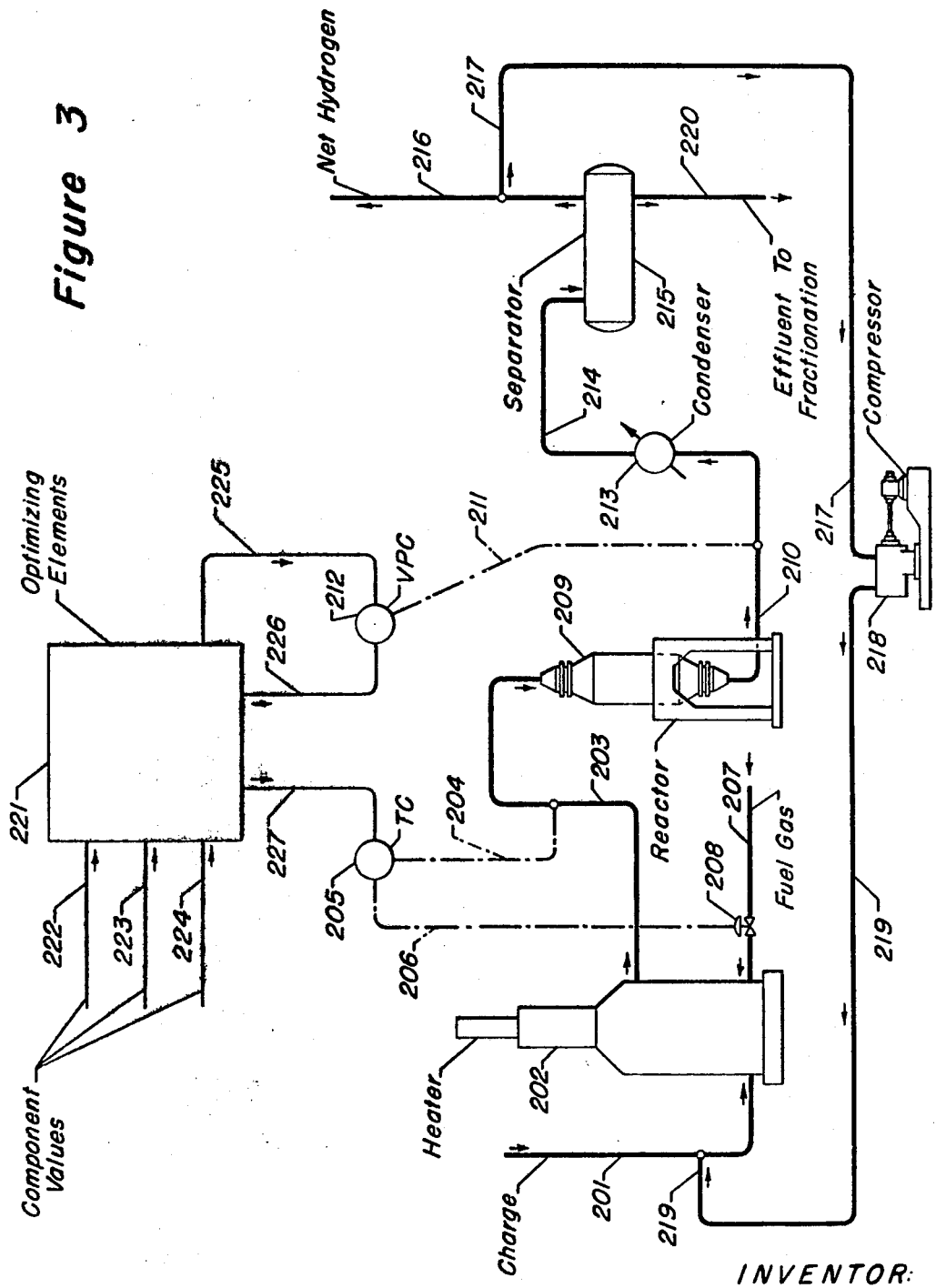
FIG. 3 is a chematic view of a catalytic reforming process operated by the control system of this invention.
Figure 4:
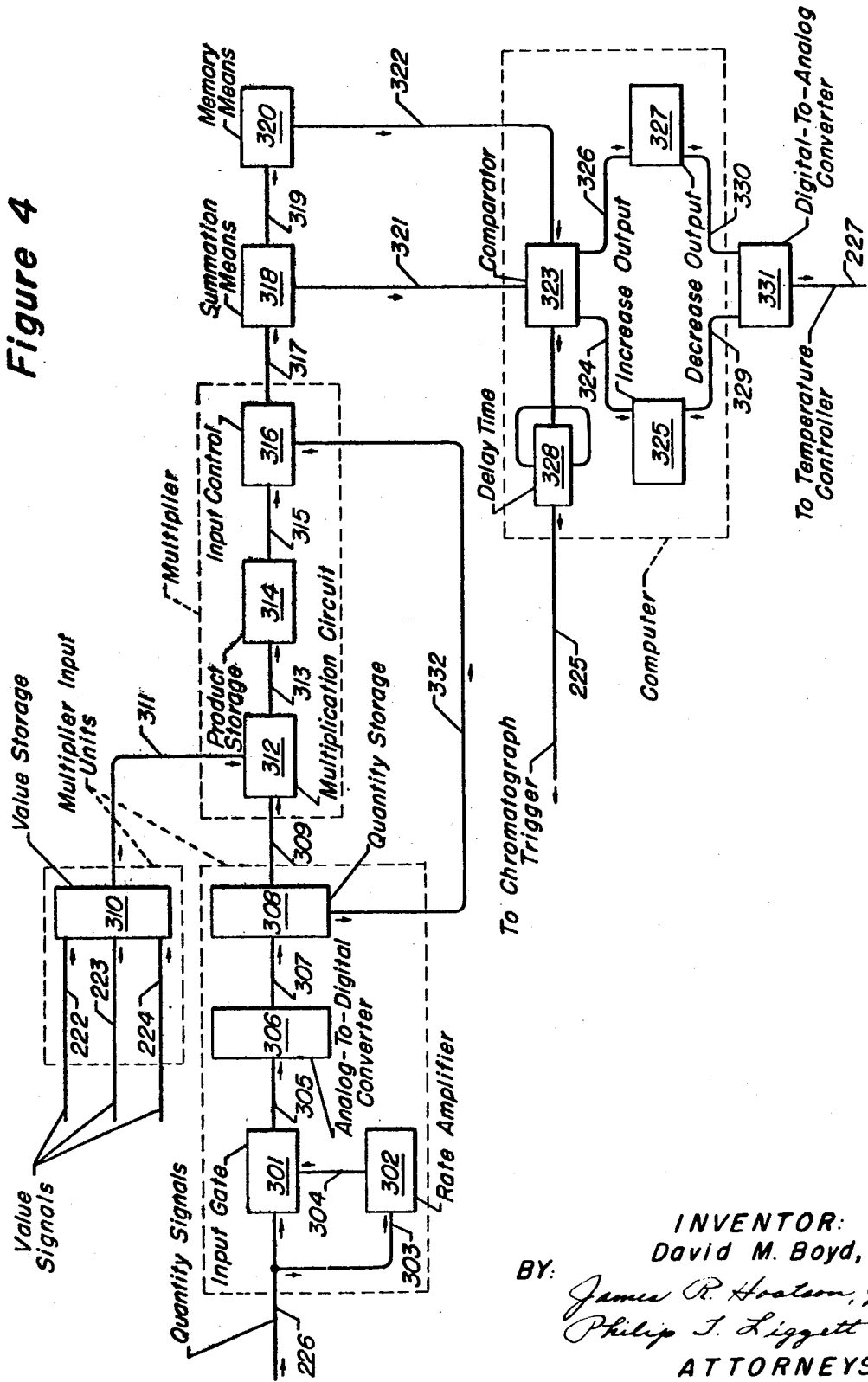
FIG. 4 depicts another specific embodiment of this invention suitable for use with the process of FIG. 3.

The predetermined unit value signals 35, 36, and 37, reflecting the current market value of the products of the process, are periodically introduced into value storage circuit 104 by way of punched tape, punched cards, magnetic tape, or by analog means such as a voltage signal derived from a voltage divider. The frequency of introduction will depend principally upon stability of the petroleum market, but new value signals may be addressed at any suitable interval, for example, once each day. Value storage circuit 104 may comprise magneto mechanical means such as a magnetic tape, drum, disc, or core, or electronic means such as a network of cascaded bistable storage elements. An example of a suitable storage circuit is shown in FIG. 3-4, chapter 3 of "High Speed Computing Devices" by Tompkins, Wakelin and stifler published in 1950 by McGraw-Hill. Value storage unit 104 may include a plurality of the counters of FIG. 3-4, one counter being employed for each unit valve signal to be stored. The unit value signals, in digital form, are withdrawn from storage on demand and are fed to the multiplier by line 105.

Flow or quantity signals 32, 33, and 34 are introduced into a second multiplier input unit comprising multiplexer 101 and analog-to-digital converter 104. The multiplexer may be a conventional gate-controlled, clock-driven diode matrix as illustrated in FIG. 6-11, page 475, of the March 1956 issue of "Instruments and Automation." The multiplexer selectively channels a multiplicity of inputs into a common output, thereby permitting analog-to-digital converter 103 to be time shared in the conversion of analog signals 32, 33, and 34 to digital form. The plate voltage of the multivibrator of FIG. 6-11 is activated by a pulse transmitted by lines 134 and 135, hereinafter described, of sufficient duration to allow visitation of each of the input channels. Line 133 is connected to the plate circuit of the final gating tube and furnishes a pulse to input control unit 111 signifying completion of the scanning cycle. A suitable analog-to-digital converter is shown in FIG. 15-3, in chapter 15 of the above mentioned reference "High Speed Computing Devices." Alternatively, the multiplexer may be omitted and a separate analog-to-digital converter would then be provided for each input channel. Quantity signals are sequentially fed into analog-to-digital converter 103 via conductor 102 and the digital equivalents thereof are sequentially transmitted by line 106 to the multiplier section.

The multiplier comprises a multiplication circuit 107, a product storage circuit 109, and an input control circuit 111. Suitable multiplication and addition circuits, as well as subtraction and division circuits are well known and are found in many forms. A suitable circuit for multiplier 107 is shown in FIG. 13-26, in chapter 13 of the above-mentioned reference "High Speed Computing Devices." Multiplication circuit 107 receives unit value signals from line 105 and quantity signals from line 106 and sequentially produces, in this example, three multiplication products signals, one for each quantity signal multiplied by its corresponding value signal, which product signals are fed to product storage circuit 109 by line 108. Storage circuit 109 contains three product registers of the type shown in the above-mentioned FIG. 13-26. Input control 111 is a gate circuit, such as illustrated in FIG. 13-26 of the above mentioned reference, which is opened by a pulse from the last stage of multiplexer 101 via line 133; in this way, multiplication product signals are retained in storage circuit 109 until all inputs have been scanned.

When the input control is opened, the stored multiplication product signals pass through lines 110 and 112 to summation means 113, which may be a conventional counter-type or coincidence-type adder; here the multiplication product signals are added to yield a resulting summation signal which is simultaneously transmitted by line 114 to memory means 115 and by line 116 to comparator 118. At the same time the last previously calculated summation signal is withdrawn from memory means 115 via line 117 and transmitted to comparator 118. Memory means 115 may comprise a pair of binary counters, one of which is being addressed from line 114 while the other is being read out via line 117.

The computer section comprises comparator 118, univibrators 120 and 122, and delay time 123. Comparator 118 is simply a subtraction circuit which subtracts the past summation signal (line 117) from the present summation signal (line 116). The comparator output is applied to the biased grid of univibrator 120 through line 119 and to the unbiased grid of univibrator 122 through line 121. A typical univibrator circuit is illustrated in FIG. 5-15, page 276, of the Feb. 1956 issue of "Instruments and Automation." If the comparison signal is positive, 161 120 emits a positive pulse which is carried by line 124 to the programming means hereinafter described; the positive pulse has no effect on univibrator 122. This positive pulse is also fed back through a suitable time delay 123, which may be a self-interrupting timer, via line 134 to trigger multiplexer 101 and initiate a new scanning cycle. The amount of time delay is determined by the process stabilization time and may vary from a few seconds to several hours depending upon the complexity of the particular process. If the above-mentioned comparison signal is negative, univibrator 122 emits a negative pulse which is carried by lines 125 and 126 to the programming means; the negative pulse has no effect on univibrator 120.

Demultiplexer 129 and output control 127 together comprise the programming means of this embodiment of the invention. Demultiplexer 129 is a gate-controlled, dual-channel diode matrix of the type illustrated in FIG. 6-9, page 474 of the March 1956 issue of "Instruments and Automation." Lines 130 and 131 each contain two conductors, one carrying the positive pulse introduced by line 124 and the other carrying the negative pulse introduced by line 125. As long as no negative pulse appears on line 125 all positive pulses appearing on line 124 will be transmitted through the demultiplexer to line 130. However, if instead a negative pulse appears on lines 125 and 126, it will be simultaneously transmitted through the demultiplexer to line 130 aNd also to the control terminal of output control 127. The output control is a pulse-delaying and inverting network of the type illustrated in 5-16, page 276 of the Feb. 1956 issue of "Instruments and Automation." The resulting output of output control 127 is a delayed positive pulse which is transmitted by line 128 to demultiplexer 129, causing the demultiplexer to switch its output from line 130 to line 131. At the same time, the delayed positive pulse is fed back through line 135 to trigger multiplexer 101 into a new scanning cycle.

The computer output means comprises a separate digital-to-analog converter 132 associated with each process condition control element. One suitable form of digital-to-analog converter will comprise a conventional digital up-down counter having a plurality of output terminals to which is connected a resistive ladder network arranged to add the weighted potentials appearing at said output terminals, thereby producing an analog signal which is proportional to the count stored in the counter. Such a ladder network is described in U.S. Pat. No. 2,718,634 issued Sept. 20, 1955 to Siegfried Hansen. A positive pulse delivered by line 130 increases the analog output of line 38 by small fixed increment; a negative pulse decreases the analog output by the same amount. If no pulse is present, the analog output is held constant at its last previous level. When the demultiplexer activates line 131, similar behavior obtains with respect to the analog output of line 39.

While this specific embodiment of the present invention is designed to accommodate three analog inputs and two outputs, it is within the broad scope of the invention to extend its adaptability to include any number of inputs and outputs. In particular, if it is desired to handle only one analog input and one output, considerable simplification will obtain thereby: Multiplexer 101 can be replaced by a simple diode gate, and product storage circuit 109, input control 111, summation means 113, and the programming means can all be eliminated. Furthermore, if the primary quantity-measuring element itself produces a digital signal as, for example, in the case of a turbine-type flowmeter, then obviously an analog-to-digital converter will not be required.

It is, of course, obvious that if it is required that a process condition be lowered to obtain its optimum value the process control system will lower it by increments rather than raise it by increments until the optimum value is obtained by finding the end of an improvement-producing series of increments. It is also obvious that certain maximum levels which may not be exceeded regardless of the product value may be established to prevent the process control system from exceeding the operating limits of the physical equipment or catalyst.

The above-described fluid catalytic cracking unit is exemplary of a process which is itself an effective analyzer of the total product; and the instantaneous flow rates of the various exit streams, the compositions of which are independently controlled, are utilized by the process control system in evaluating the performance of the process. There are many applications, however, in which it is not feasible to adapt this method of control. Frequently the time constants downstream fractionation facilities are so long and the total process stabilization time so excessive that the performance of the control system would be seriously impaired if the system of FIGS. 1 and 2 were employed. Also, it may not be practical to control the composition of the product streams. Therefore, in such cases it is desirable to measure directly the composition of an effluent stream.

An example of such a process is shown in FIG. 3 which illustrates a catalytic reforming unit wherein a straight run or natural gasoline or a mixture of one of these or both of them with cracked material to produce a charge usually having an octane number in the range of 40 or 50 is treated with platinum-alumina catalyst, preferably containing halogen, in the presence of hydrogen at temperatures in the range of 800° to 1,000° F. and superatmospheric pressure to produce from the charge stock a gasoline fraction richer in aromatic hydrocarbons, highly branched chain hydrocarbons and lower boiling hydrocarbons all of which improve the octane rating and result in a product having an octane number in the range of 90. As in the previously described process, improvement in the product as the reaction temperature is increased is obtained at a sacrifice of yield of the higher boiling hydrocarbons, and it is therefore necessary to evaluate the improvement in terms of dollars and weigh it against the product losses in terms of dollars.

Referring now to FIG. 3, charge stock is introduced in line 201 and commingled with recycle hydrogen from line 219. The mixture is heated to reaction temperature in heater 202 and is passed through transfer line 203 into reactor 209 which contains the reforming catalyst. The reactor inlet temperature is controlled by temperature controller 205, which receives a temperature signal from thermocouple 204 and transmits a control signal via line 206 to throttle valve 208 disposed in fuel gas line 207. Although only one reactor is shown here, it is customary to provide several reactors in series with intermediate heating means disposed therebetween, each reactor inlet temperature being automatically controlled. Reactor effluent is removed through line 210, partially condensed in condenser 213, and discharged through line 214 into separator 215. Liquid product is withdrawn therefrom through line 220 and is directed to downstream fractionation facilities. Since the reforming process is hydrogen producing, net hydrogen is removed from the unit through line 216 while the balance of the hydrogen is continuously recycled via line 217, compressor 218 and line 219.

A small sample stream of reactor effluent is withdrawn through line 211 and admitted to an automatic vapor phase chromatograph 212. The sampling cycle of the chromatograph is initiated by a triggering pulse from optimizing elements 221 via line 225. The chromatograph can be calibrated to respond to any number of hydrocarbons in the effluent whether they be aromatics, isoparaffins, cycloparaffins, etc. In the present example the chromatograph is calibrated to analyze a measured sample for three hydrocarbons, for example, benzene, an isohexane, and an isoheptane. The analysis may require from several minutes to an hour or more depending upon the type and boiling point range of the hydrocarbons being analyzed. During this time the chromatograph transmits to optimizing elements 221 via line 226 a series of discontinuous analog signals which are relatively broad, unidirectional pulses similar to normal error curves. Each signal corresponds to a particular hydrocarbon and the time integral of the signal is proportional to the quantity of that hydrocarbon in the measured sample. In many cases, particularly where the unidirectional pulses are symmetrical with respect to time, the peak height alone is a satisfactory measure of quantity and integration of the signals become unnecessary. Since the volume of the samples received by the chromatograph is controlled to a high degree of reproducibility, a quantity signal derived from the sample is equivalent to the total quantity of that hydrocarbon in effluent stream 210.

Optimizing elements 221 receive and integrate each of these quantity signals, convert them to digital form, and store them until the sampling cycle is completed. Predetermined value signals 222, 223 and 224, representative of the unit value of the three hydrocarbons being analyzed, have previously been addressed into the optimizing elements and stored therein. Each of the quantity signals is then multiplied by its corresponding value signal, the resulting multiplication product signals are added to yield a summation signal, and the optimizing elements incrementally vary the set point of temperature controller 205 through line 227 until the summation signal is maximized. With the exception of a different multiplier input unit and the omission of a programming means, the components of optimizing elements 221 and the trial-and-error method of operation thereof are identical to the process control system of FIG. 2.

The various elements represented by box 221 and the interrelationship therebetween are shown in FIG. 4. The quantity signals from the chromatograph are intermittently transmitted during the sampling cycle by line 226 into a first multiplier input unit which comprises input gate 301, rate amplifier 302, analog-to-digital converter 306, and quantity storage circuit 308. Input gate 301 serves to admit a quantity signal 226 to analog-to-digital converter 306 via line 305 wherever the quantity signal is changing with respect to time, that is, whenever the chromatograph emits a signal. In one form, input gate 301 comprises a dual-grid gate or coincidence circuit, used as that illustrated in FIG. 4–1a, chapter 4 of the above-mentioned reference "High Speed Computing Devices," whose output is used to back-bias a diode switch through a control triode; the circuitry for the diode switch and control triode is shown in FIG. 3–16, page 2,115 of the Dec. 1955 issue of "Instruments and Automation." The circuit of said FIG. 3–16 may be simplified to include only one channel and one triode. Rate amplifier 302 is a conventional AC amplifier which produces an output only when its input is changing, that is, the plate circuit thereof includes an RC differentiator. Line 226 is connected to one grid of the dual-grid gate and also to the grid of rate amplifier 302 via line 303; the output of rate amplifier 302 is connected via line 304 to the other grid of the dual-grid gate. The simultaneous presence of signals on lines 226 and 304 generates a gating pulse which is applied to the grid of the control triode, activating the diode switch. Line 226 is also connected to the input of the diode switch, and line 305 to the output thereof; the chromatograph quantity signal is thus transmitted via line 305 to analog-to-digital converter 306. Each varying quantity signal is in turn converted to digital form by analog-to-digital converter 306 and transmitted by line 307 to quantity storage circuit 308, which stores the total count produced during the duration of the particular quantity signal; thus the signal stored therein represents at time-integration of the quantity pulse. When the integration is completed, the stored quantity signal is withdrawn and transmitted to multiplication circuit 312, and the quantity storage circuit is cleared to receive the next quantity signal of the present sampling cycle.

Unit value signals 222, 223 and 224 are addressed into a second multiplier input unit comprising value storage circuit 310. Multiplication circuit 312 receives value signals form line 311 and quantity signals from line 307, multiplies each quantity signal by its corresponding unit value signal and transmits the resulting multiplication product signal 313 to product storage circuit 314. When all of the hydrocarbons of interest have been analyzed, three in this case, input control 316 is triggered open by a pulse from quantity storage circuit 308 through line 332, and the stored multiplication product signals are transmitted by lines 315 and 317 to summation means 318. The multiplication product signals are added and the resulting summation signal is passed simultaneously into memory means 320 by line 319 and to comparator 323 by line 321. Comparator 323 subtracts the last previously calculated summation signal (line 322) from the present summation signal (line 321). The resulting comparison signal is transmitted to univibrators 325 and 327 via lines 324 and 326 respectively. A positive comparison signal triggers univibrator 325, causing a positive pulse to be sent to digital-to-analog converter 331 via line 329. A negative comparison signal triggers univibrator 327, causing a negative pulse to be sent to digital-to-analog converter 331 via line 330. Analog output 227 is thus incrementally varied upwardly or downwardly in response to the comparison between present and past summation signals. The comparator output is also fed back through delay time 328 and line 225 to trigger the chromatograph, thereby initiating a new sampling cycle and repeating the above sequence.

After the optimum reaction temperature has been sought out, the discontinuous nature of the process control system will cause the temperature set point to make small excursions about the optimum level, but the magnitude of the excursion will be so small as to have a negligible effect on the stability of the process. When the optimum level is reached, the magnitude of the comparison between present and past summation signals will be a minimum.

Although the specific embodiment of the invention as set forth in FIG. 4 is designed to act upon only one process condition control element, it may easily be expanded to accommodate a plurality of outputs, as in the embodiment of FIG. 2, by including suitable programming means and additional digital-to-analog converters. Also, if process requirements so dictate, the process control system can be modified to accept in combination continuous analog quantity signals, discontinuous analog quantity signals by providing a separate multiplier input unit appropriate for each class of signal.

The process control system of this invention may evaluate qualities of a process which affect its economics other than the various products of the process. Frequently there is involved in a process one or more negative factors which operate to offset the advantage gained through yield optimization alone. The negative factor may be presently impalpable, such as gradual catalyst deactivation with time on stream, deterioration of process equipment, accumulation of trace impurities, etc. Or the negative factor may be readily apparent but still not amenable to a predetermination as to its true effect on the performance of the process, as, for example, the quantity of fuel, steam, electric power or other energy forms consumed by the process, labor costs, overhead, etc. In general, as the severity of operation is increased when converging upon the optimum level of a process condition, the rate-of-change of total product value with respect to the process condition decreases, while the rate-of-change of the cost of the negative factors increases. In consequence there will exist a unique level of the process condition such that the difference between the total product value and the cost of the negative factors is a maximum, and the optimum level as established by this criterion will be lower than it would be if the effect of the negative factors were integrated. Although in some processes, by virtue of low utility requirements as compared to product value, the cost of operation is relatively independent of its severity and may therefore by disregarded, in other processes, for example, physical separation processes such as fractionation and extraction, the cost of operation is the greatest single consideration in realizing the maximum profit therefrom. As a general rule, the more difficult the separation the more energy per pound of charge is required to effect it.

Figure 5:
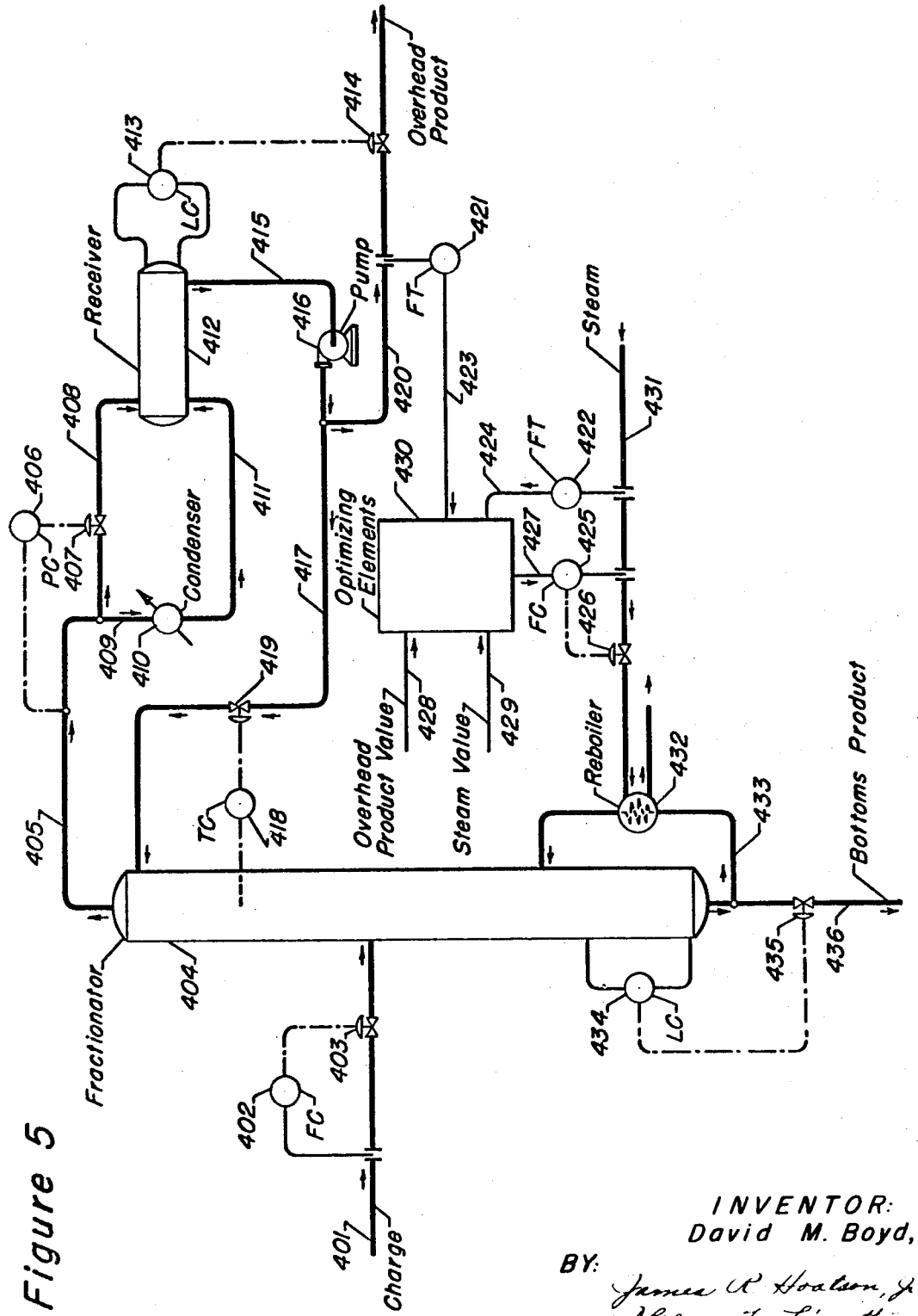
FIG. 5 is a schematic vie of a typical fractionation process together with control apparatus associated therewith.

An example of a typical fractionation process controlled by another embodiment of this invention is shown schematically in FIG. 5. Charge stock consisting of a mixture of hydrocarbons is introduced through line 401 into fractionator 404; the charge flow-controlled by flow controller 402, which actuates valve 403. Overhead vapors pass through lines 405 and 409 and are totally condensed in overhead condenser 410. The liquid overhead passes therefrom through line 411 into overhead receiver 412. Pressure controller 406 controls the fractionator pressure by throttling valve 407 disposed in hot vapor bypass line 408. Overhead pump 416 withdraws overhead liquid through line 415 and discharges a portion thereof through line 417 as reflux and the remainder through line 420 as net overhead product. The fractionator top middle temperature is under the control of temperature controller 418 which varies the quantity of reflux by throttling valve 419. Level controller 413 is responsive to the liquid level within overhead receiver 412 and controls the overhead product withdrawal rate by means of valve 414. Flow transmitter 421 measures the flow rate of the overhead product and transmits a signal in response thereto, via line 423, to optimizing elements 430. Level controller 434 controls the fractionator level by throttling valve 435 disposed in bottoms product withdrawal line 436. A major portion of the bottoms is circulated through line 433 and reboiler 432 and is partially vaporized therein. Heat in the form of steam is supplied to the top side of reboiler 432 through line 431. The steam flow rate, and therefore the heat input to the fractionator, is controlled by flow controller 425 and valve 426. Flow transmitter 422 measures the flow rate of the steam and transmits a signal responsive thereto via line 424 to optimizing elements 430.

If steady-state conditions are to prevail, the fractionating column must be kept in heat balance, that is, the heat supplied by reboiler 432 plus the heat content of the charge and the reflux streams must equal the heat content of the overhead vapors and the bottoms product plus normal radiation and conduction losses to the surroundings. Assuming the fractionator has been brought up to steady-state operation at optimum conditions, a further increase in the steam flow rate will eventually result in an increased reflux rate; the increased consumption of steam, condenser cooling water, and pump horsepower will greatly increase the cost of operation with little appreciable increase in the quantity of overhead product. If the steam flow rate is decreased from its optimum level, insufficient fractionation will occur. The quantity of overhead product will decline and the bottoms product will become unduly contaminated with lower boiling hydrocarbons.

The process control system of this invention functions to maximize the net dollar output of the fractionation process by striking a balance between the quantity of overhead product and the heat input to the process. Optimizing elements 430 receive predetermined unit value signals 428 and 429, representative of the value of overhead product and steam respectively, and also receive flow signals 423 and 424 corresponding to the quantity of overhead product and the quantity of steam. Each quantity signal is multiplied by its corresponding value signal to yield two multiplication product signals representative of the dollar value of overhead product and of steam. The steam value is subtracted from the overhead product value and the resulting difference signal is compared with a last previously calculated difference signal. On the basis of this comparison optimizing elements 430 incrementally vary the set point of flow controller 425 via line 417 until the difference signal attains a maximum.

Figure 6:
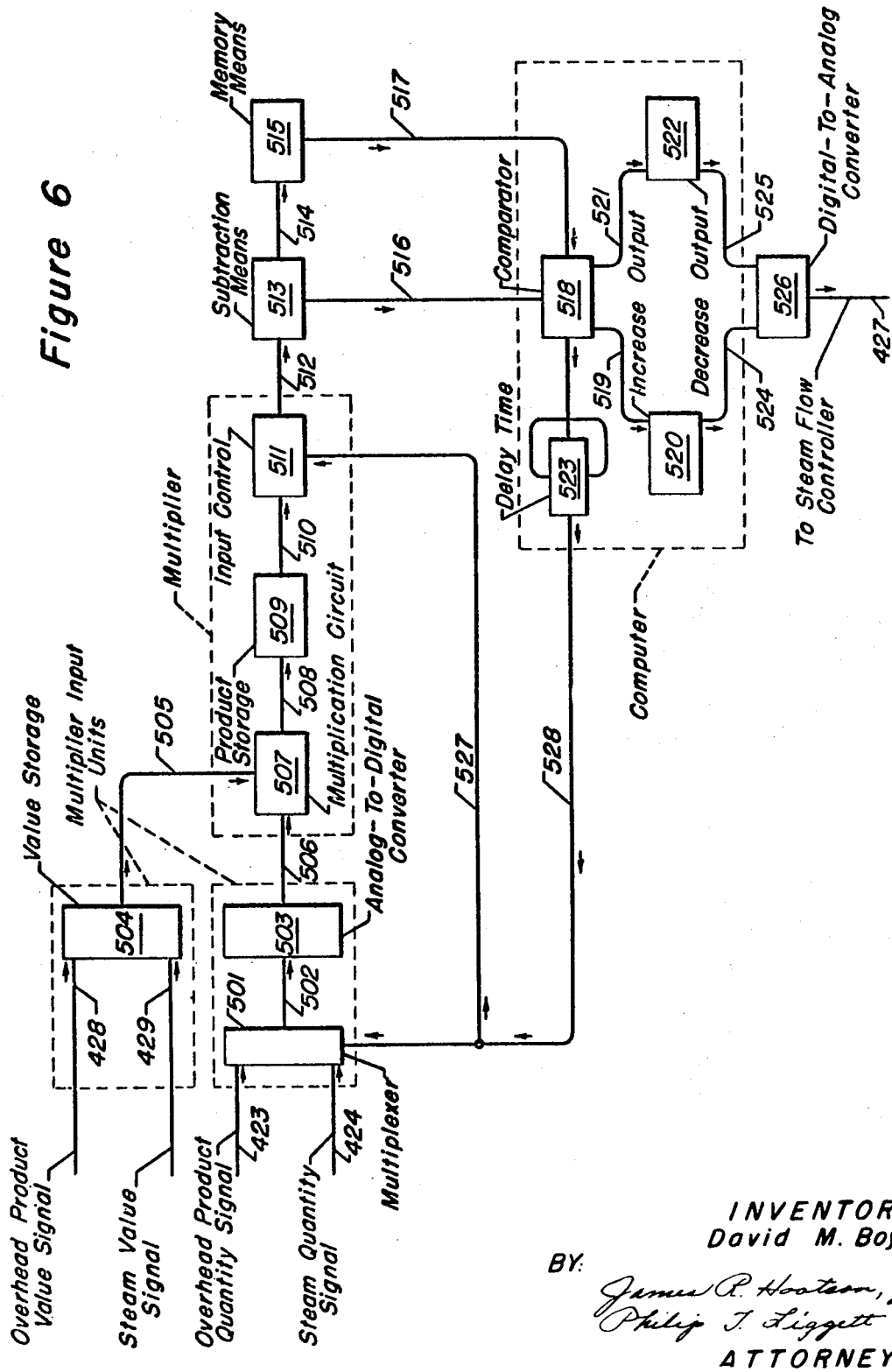
FIG. 6 illustrates another specific embodiment of this invention adapted for use with the fractionation column in FIG. 5.

The various elements represented by box 430 are shown in FIG. 6. The major components thereof are two multiplier input units, a multiplier, a subtraction means, a memory means, a computer, and a digital-to-analog converter. Predetermined unit value signals 428 and 429 are periodically addressed into value storage circuit 504, which comprises a first multiplier input unit. Analog quantity signals 423 and 424 are introduced into a second multiplier input unit comprising multiplexer 501 and analog-to-digital converter 503. Upon communication of a scanning cycle, the quantity signals are sequentially fed to analog-to-digital converter 503 via line 502 and the digitized quantity signals are sequentially transmitted to the multiplier by line 506.

THe multiplier section comprises multiplication circuit 507, product storage circuit 509, and input control 511. Multiplication circuit 507 receives an overhead product quantity signal from line 506 and the corresponding unit value signal from line 505, and multiplies the two signals to yield a first multiplication product signal equivalent to the total value of the overhead product; this latter signal is sent via line 508 to products storage circuit 509. The multiplication circuit next receives a steam quantity signal and the steam unit value signal and multiplies the two signals to yield a second multiplication product signal equivalent to the total value of the steam; this signal is also fed to product storage circuit 509. When the scanning cycle is completed, a pulse from the last stage of multiplexer 501 is sent via line 527 to input control 511. The input control, or gate, is then opened and the two multiplication product signals are withdrawn from storage and transmitted by lines 510 and 512 to subtraction means 513.

Subtraction means 513 deducts the total steam value from the total overhead product value and transmits a resulting difference signal simultaneously through line 514 to memory means 515 and through line 516 to comparator 518.

The computer section comprises comparator 518, delay time 523, and univibrators 520 and 522. Comparator 518 subtracts the last previously calculated difference signal (line 517) from the present difference signal (line 516). The comparator output is applied to grids of univibrators 520 and 522 via lines 519 and 521 respectively. The comparator output is also fed back through delay time 523 and line 528 to trigger multiplexer 501 and initiate a new scanning cycle. If the comparison signal is positive, univibrator 520 sends a positive pulse via line 524 to digital-to-analog converter 526. If the comparison signal is negative, univibrator 522 sends a negative pulse to digital-to-analog converter 526 via line 521. Analog output 427 is then incrementally varied upwardly or downwardly in response to the comparison between present and past difference signals.

As with the specific embodiments of this invention previously illustrated, the control apparatus of FIGS. 5 and 6 can be substantially altered without departing from the spirit and scope of the invention. The control system may be enlarged to handle a plurality of quantity signals as well as a plurality of negative factor signals. Through the addition of suitable programming means and the requisite number of digital-to-analog converters, the control system may be adapted to reset any number of process condition control elements. The negative factor or factors subject to consideration by this invention are by no means limited to consumption of steam, fuel, cooling water, electric power or other forms of energy, but can be extended to include any variable which can be automatically measured or otherwise mathematically interpreted and which effects the economics of the process. If, for example, corrosion of equipment may be taken into account, a radioactive thickness gauge could be employed to measure corrosion rate. Or if accumulation of inerts or contaminants within the process presents a problem, a suitable composition analyzer could be provided to measure such accumulation. Applying the process control system to a catalytic reforming process, wherein a rather expensive catalyst suffers a gradual deactivation, to include an evaluation of catalyst life, each significant processing condition might be varied as heretofore described; however, the changed increment of each processing condition may be held constant for two time intervals, the process performance measured during the second interval being compared with the performance measured during the first interval and attributing the difference in performance between the two time intervals at identical conditions to a loss of catalyst activity. This loss per interval may be extrapolated to produce a measure of catalyst deactivation rate, which, when measured against the price of catalyst and the cost of replacement will effect the dollar value of the product to determine whether or not the conditions employed are optimum.

Process condition control elements suitable for us in conjunction with the control system of this invention include those commonly used and commercially available instruments that are well known in the process industries. Such instrumentation may employ electronic, pneumatic, or hydraulic signals or any combination thereof. Preferably a process condition control element will itself be a complete closed loop control system comprising, for example, a locally mounted transmitter, a board-mounted controller, and a control valve, or a locally mounted controller and control valve; however, in some instances the process condition control element may simply be a control valve or other flow-adjusting means. It is obvious that where the signal utilized by the process condition control element is incompatible with the analog output of the computer output means, as for example when a pneumatic control system is employed, a suitable transducer, such as a voltage-to-pressure converter, will be inserted between the computer output means and the process condition control element.

While the flow transmitters and automatic chromatograph of the foregoing embodiments of this invention are illustrative of suitable quantity responsive means, it is contemplated that any analyzing means capable of producing a signal responsive to the quantity of a component of the product of the process can be employed. Examples of such analyzing means include, but are not limited to, differential refractometers, hygrometers, colorimeters, infrared analyzers, ultraviolet analyzers, mass spectrometers, oxygen analyzers, $CO_2$ analyzers, and many others. In the electric power industry where the product is electricity, suitable analyzing means include ammeters, wattmeters, etc. It is obvious that where the signal produced by the analyzing means is incompatible with signals intended to be received by the multiplier input unit, an appropriate transducer will be connected between the analyzing means and the multiplier input unit.

While modern composition analyzers are accurate, they are not too reliable and for this reason it is preferred that process flows be utilized wherever possible; process flows are not as accurate, but they reflect small changes and are more reliable. Although the absolute accuracy of a typical flow measuring device is hardly better than 2 percent, the sensitivity, or ability to detect a change, of the newer electronic instruments is at least 1 part in 30,000 or better.

While the preferred construction of this invention uses digital computing elements, analog computing elements may be substituted therefor if so desired. For example, the operations of multiplication, additon and subtraction may be performed by pneumatic computing relays, electronic summing amplifiers, servo multipliers, and the like. Preferably the digital circuitry of the present invention utilizes solid state components such as transistors, diodes, and magnetic amplifiers wherever possible. It may be further noted, that equivalent circuitry may employ vacuum tubes or even electromechanical relays without going beyond the broad scope of this invention.

THere are many additions which may be made to the process control system to make its use more convenient, more beneficial or more useful but which are not absolutely essential to its functioning. A few improvements include a recording means associated with the process control system which makes a continuous or periodic legible record or log of the operation for future study or as a check on the conditions currently in use. This logging means or recorder includes the use of sensing elements to obtain the quality of conditions, a means for introducing these sensations into the process control system and a recording means such as an automatic typewriter or its equivalent for making a legible record. All of these elements are well known and may readily be associated with the process control system.

The process control system may also be readily adapted to function during an entire operation by providing a means such as a magnetic tape or a punched tape to introduce instructions into the process control system for starting up or shutting down an operation. For example, the punched or magnetic tape may be used to program the gradual rise of temperatures, pressures, etc. up to the desired level, to introduce the charge to the process at the proper time, to start fractionation equipment when sufficient product is made, etc. THe tape may also instruct the process control system to slowly bring down temperatures, pressures, etc. at the end of an operating period or when a particular minimum yield is no longer obtainable from the process due to loss of catalytic activity or some other reason.

Although the process control system of this invention has been described in detail only in relation to petroleum refining, it is evident that it may be employed equally well in the control of many other industrial processes. Such industries as the electric power industry, the steel industry, the manufacture of paint, paper, fabric, the refining of vegetable products including sugar, starch, resins, coal or wood tar, etc., the refining of edibles and animal products, etc., are typical but not all inclusive of process industries which could be benefited by a process control system as herein described.

As hereinbefore described, it is difficult, if not impossible, to calculate the process equation in advance; even if this were possible, the process characteristics are time variant and depend upon unknown disturbances such as changing catalyst activity, composition changes, etc. The present invention overcomes this difficulty by using the process itself as an analog model in evaluating both the effects of the self-imposed changes in processing conditions and the effects of unknown disturbances, such effects being manifested by a change in the quantity of one or more components of the product.

In view of the foregoing, it is clear that the process control system of this invention, acting upon and in cooperation with a process, provides a novel means by which the control system continuously tries significant processing conditions in order to seek out and maintain optimum conditions which cannot be calculated or otherwise be predetermined.

I claim as my invention:

1. The method of optimizing the operation of a process having a material input and a material output comprising a plurality of components of different unit economic values, the relative yields of which components vary in dependence upon the setting of at least one variable parameter, said process being further characterized in that its performance criterion as defined below has a maximum corresponding to a particular setting of said parameter, said performance criterion consisting in the summation of the magnitudes of said components as measured in said output, each such component magnitude being first weighted by its respective unit economic value, which comprises setting said parameter at a first setting, registering the performance criterion at said setting, changing said parameter by a predetermined increment, a predetermined time interval after said change sufficient to enable said process to stabilize registering the performance criterion of said process in said last-named setting of said parameter, after said last-named registering evaluating the change in said performance criterion produced by said last-named setting, and repeating the aforesaid sequence of steps until said performance criterion is substantially maximized.

2. The method of optimizing the operation of a catalytic cracking process wherein a charge stock comprising relatively high boiling petroleum is contacted with a catalyst in a reaction zone under cracking conditions, and wherein the resulting effluent from said reaction zone is separated to provide a plurality of separate product streams having different unit economic values, the relative yields of which products vary in dependence upon the setting of at least one variable parameter selected from the group consisting of reaction zone temperature and reaction zone space velocity, said cracking process being further characterized in that its performance criterion as defined below has a maximum corresponding to a particular setting of said parameter, said performance criterion consisting in the summation of the flow rates of said product streams, each such flow rate being first weighted by its respective unit economic value, which method comprises setting said parameter at a first setting, registering the performance criterion at said setting, changing said parameter by a predetermined increment, a predetermined time interval after said change sufficient to enable said process to stabilize registering the performance criterion of said process in said last-name setting of said parameter, after said last-named registering evaluating the change in said performance criterion produced by said last-named setting, and repeating the aforesaid sequence of steps until said performance criterion substantially maximized.

3. The method of optimizing the operation of a catalytic reforming process wherein a gasoline charge stock is treated in a reaction zone with a platinum-containing catalyst in the presence of hydrogen to provide a gasoline product of improved octane rating comprising a plurality of components of different unit economic values, the relative yields of which components vary in dependence upon reaction zone temperature, said reforming process being further characterized in that its performance criterion as defined below has a maximum corresponding to a particular setting of said temperature, said performance criterion consisting in the summation of the magnitudes of said components, each such component magnitude being first weighted by its respective unit economic value, which method comprises setting said temperature at a first setting, registering the performance criterion at said setting, changing said temperature by a predetermined increment, a predetermined time interval after said change sufficient to enable said process to stabilize registering the performance criterion of said process in said last-named setting of said parameter, after said last-named registering evaluating the change in said performance criterion produced by said last-named setting, and repeating he aforesaid sequence of steps until said performance criterion is substantially maximized.